US007577517B2

(12) United States Patent
Nagasawa

(10) Patent No.: US 7,577,517 B2
(45) Date of Patent: Aug. 18, 2009

(54) GUIDED VEHICLE SYSTEM AND TEACHING METHOD IN THE GUIDED VEHICLE SYSTEM

(75) Inventor: Atsuo Nagasawa, Gifu (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 374 days.

(21) Appl. No.: 11/495,787

(22) Filed: Jul. 31, 2006

(65) Prior Publication Data

US 2007/0027615 A1 Feb. 1, 2007

(30) Foreign Application Priority Data

Aug. 1, 2005 (JP) ............................ 2005-222864

(51) Int. Cl.

| | |
|---|---|
| ***G01C 21/00*** | (2006.01) |
| *G06F 19/00* | (2006.01) |
| *G06F 7/00* | (2006.01) |
| *G01C 22/00* | (2006.01) |
| *B25J 1/00* | (2006.01) |
| *B65G 25/00* | (2006.01) |
| *B65G 1/33* | (2006.01) |

(52) U.S. Cl. .......................... 701/200; 701/11; 701/19; 701/23; 701/24; 701/25; 701/26; 701/30; 701/89; 701/109; 701/300; 700/254; 700/228; 700/229; 414/1; 414/147; 414/749.1; 414/785; 324/758; 324/754

(58) Field of Classification Search ............ 701/23–26, 701/11, 19, 29, 30, 89, 109, 300; 700/254, 700/228, 229; 414/1, 147, 749.1, 785; 714/46; 324/758, 754

See application file for complete search history.

(56) References Cited

U.S. PATENT DOCUMENTS

| | | | | |
|---|---|---|---|---|
| 7,343,995 | B2 * | 3/2008 | Fukuhara et al. | 180/168 |
| 7,363,107 | B2 * | 4/2008 | Chae et al. | 700/226 |
| 7,474,945 | B2 * | 1/2009 | Matsunaga | 701/25 |
| 2001/0002447 | A1 * | 5/2001 | Kawamatsu et al. | 700/229 |
| 2005/0137751 | A1 * | 6/2005 | Cox et al. | 700/245 |
| 2006/0155436 | A1 * | 7/2006 | Matsunaga | 701/23 |
| 2006/0161318 | A1 * | 7/2006 | Aldred et al. | 701/23 |

FOREIGN PATENT DOCUMENTS

| | | |
|---|---|---|
| JP | 11-60156 A | 3/1999 |
| JP | 11-151627 A | 6/1999 |
| JP | 2004-227058 A | 8/2004 |

* cited by examiner

*Primary Examiner*—Khoi Tran
*Assistant Examiner*—Ian Jen
(74) *Attorney, Agent, or Firm*—Westerman, Hattori, Daniels & Adrian, LLP.

(57) ABSTRACT

Each of guided vehicles has an operating condition memory unit for storing the total travel distance, the travel time, the number of travels, the number of errors at a stop position, and the number of article transfers. These values are evaluated by an evaluation unit 53, and the machine difference is measured again for each of the guided vehicles.

4 Claims, 4 Drawing Sheets

| | | | | |
|---|---|---|---|---|
| TRAVEL CONTROL | TRAVEL DISTANCE | TRAVEL TIME | NUMBER OF TIMES | NUMBER OF ERRORS |
| LATERAL CONTROL | NUMBER OF OPERATIONS | | | |
| θ CONTROL | NUMBER OF OPERATIONS | | | |
| ELEVATION CONTROL | NUMBER OF OPERATIONS | | | |
| OTHER | NUMBER OF ERRORS | OPERATION START DATE | NUMBER OF UPDATES | LAST UPDATE DATE |

52

GUIDED VEHICLE SYSTEM AND TEACHING METHOD IN THE GUIDED VEHICLE SYSTEM

TECHNICAL FIELD

The present invention relates to a guided vehicle system. In particular, the present invention relates to a technique of managing the machine difference of each guided vehicle.

BACKGROUND ART

Japanese Patent No. 3367389 discloses a technique of selecting a certain guided vehicle and a certain station in a guided vehicle system, and creates transfer data at every station for every guided vehicle. Firstly, article transfer data at the certain station, i.e., data for transferring an article to/from the certain station is obtained for every guided vehicle, and machine difference data is obtained by subtracting the transfer data for the certain guided vehicle from the transfer data of each of individual guided vehicles. Then, for the certain guided vehicle, the article transfer data at every station is obtained. The article transfer data for respective guided vehicles, at respective stations can be obtained by adding the machine difference data to the transfer data of the certain guided vehicle. In the technique, even if the number of the guided vehicles is increased, or the number of the stations is increased, the number of operations for obtaining the transfer data can be limited within the sum of the number of the guided vehicles and the number of stations.

Once a guided vehicle obtains the machine difference data (once teaching of the machine difference is carried out), basically, the guided vehicle will not obtain the machine difference data again. The guided vehicle obtains the machine difference data again only at the time of carrying out maintenance operation in the presence of any failure. Thus, the change of the machine difference is not considered until the occurrence of the failure.

SUMMARY OF THE INVENTION

An object of the present invention is to make it possible to maintain the accuracy in the article transfer operation by updating the machine data without waiting the occurrence of a significant failure.

Secondary object of the present invention is to allow a guided vehicle to autonomously manage the credibility of the machine data.

Secondary object of the present invention is to make it possible to detect a sign indicating the necessity of updating the machine data in terms of the accuracy of stopping the guided vehicle for updating the machine difference data.

In a guided vehicle system according to the present invention, a certain guided vehicle obtains transfer data for transferring an article at a transfer position, the other guided vehicle determines a difference of transfer data from the certain guided vehicle at a predetermined transfer position as machine difference data, and data obtained by adding the machine difference data to the transfer data obtained by the certain guided vehicle is stored as transfer data at each transfer position. The guided vehicle system comprises determination means for determining whether the machine difference data needs to be measured again based on conditions of each of guided vehicles.

It is preferable that the determination means is provided in each of the guided vehicles for storing own operating condition and determining whether the machine difference data needs to be measured again, and if it is determined that the machine difference data needs to be measured again, the guided vehicle travels to the predetermined transfer position to obtain the machine difference data again.

Further, it is preferable that each of the guided vehicles has means for detecting an error at a stop position for stopping each of the guided vehicles at the transfer position, and at least the error is stored as the condition.

Further, it is preferable that: each of the guided vehicles has a travel unit supported by a travel rail in an overhead space for traveling along the travel rail, and an elevation unit supported by the travel unit for elevating/lowering the article;

a mark indicating a stop position for stopping each of the guided vehicles at the transfer position is provided along the travel rail, and the travel unit has a sensor for detecting the mark to determine an error at the stop position;

the elevation unit has means for detecting a failure in transferring the article at the transfer position; and the determination means determines a value indicating the degree of the error at the stop position, and a value indicating the degree of the transfer failure. For example, the value indicating the degree of the error at the stop position is the number of errors with a predetermined value or more, the ratio between the number of errors and the number of transfers, the average of errors, the moving average of errors, the number of successive errors with a predetermined value or more. Further, for example, the value indicating the degree of the transfer failure at the stop position is the number or transfers, the ratio between the number of transfer failures and the number of transfers, the number of successive transfer failures. Preferably, the transfer failure is considered in the case where the error at the stop position has a predetermined value or less.

In particular, it is preferable that the determination means counts a number of errors with a predetermined value or more at the stop position as a value indicating a degree of the error at the stop position, and counts a number of transfer failures as a value indicating a degree of the transfer failure.

Most preferably, the determination means stores a time when the machine difference data was updated, determines whether the machine difference data needs to be obtained again at least based on a lapsed period of time from the update time, the number of the errors with the predetermined value or more at the stop position, and the number of the transfer failures, and resets the number of the errors with the predetermined value or more at the stop position and the number of the transfer failures when the machine difference data is obtained again. For example, as for the update time, the update date or the lapsed period of time from the update date is stored.

In a teaching method in guided vehicle system according to the present invention, a certain guided vehicle obtains transfer data for transferring an article at a transfer position, the other guided vehicle determines a difference of transfer data from the certain guided vehicle at a predetermined transfer position as machine difference data, and data obtained by adding the machine difference data to the transfer data obtained by the certain guided vehicle is stored as transfer data at each of transfer positions. The teaching method comprises the steps of:

determining whether the machine difference data needs to be measured again based on conditions of each of guided vehicles; and measuring the transfer data at the predetermined transfer position again, for a guided vehicle which needs measurement of the machine difference data again, to newly determine machine difference data to update the transfer data at each of the transfer positions.

In the present invention, determination of whether the machine difference data needs to be measured again is made based on the conditions of the individual guided vehicles. Thus, it is possible to prevent the machine difference data from being deviated from the actual condition of the guided vehicle. Thus, before a significant trouble which can be noticed easily by the operator occurs, the machine difference data is measured again, and updated.

In the present invention, preferably, the necessity of the update (re-measurement) of the machine data can be determined autonomously by each of the guided vehicles. In particular, in determining the presence of the update of the machine data, it is preferable to use data such as the number of article transfers, the number of errors at the time of traveling, or at the time of transferring an article. It is not necessary to send these items of data from the guided vehicle to the system controller. Thus, the burden on the controller and the communication traffic do not increase.

In the present invention, preferably, based on the error at the stop position for stopping the guided vehicle at the transfer position, the change in the abrasion condition of the travel wheels or the like is detected, and the information is taken into consideration in determining whether the machine data needs to be measured again. Thus, the high accuracy in stopping the guided vehicle is maintained. It should be noted that the difference in the abrasion condition of the travel wheels is a cause of creating a machine difference, and the travel wheels are abraded easily in comparison with other mechanical components of transfer means mounted in the guided vehicle.

BRIEF DESCRIPTION OF THE SYMBOLS

| | |
|---|---|
| 2 | Guided vehicle system |
| 4 | Inter-bay route |
| 6-8 | Intra-bay route |
| 9 | Maintenance bay route |
| 10 | Guided vehicle |
| 12 | Position for transferring article |
| 14 | Master station |
| 15 | Master vehicle |
| 16 | System controller |
| 20 | Travel control unit |
| 22 | Linear sensor |
| 23 | Linear scale |
| 24 | Lateral control unit |
| 26 | θ control unit |
| 28 | Elevation control unit |

-continued

| | |
|---|---|
| 21, 25, 27, 29 | Encoder |
| 30 | Landing sensor |
| 31 | Fixed position sensor |
| 32 | Map |
| 34 | Machine difference management unit |
| 36 | Communication unit |
| 40 | Map |
| 41 | Blocking processing unit |
| 42 | Transportation management unit |
| 43 | Machine difference management unit |
| 50 | Input/output |
| 52 | Operating condition memory unit |
| 53 | Evaluation unit 53 |
| M1-M4 | Motor |

EMBODIMENT

Hereinafter, an embodiment in the most preferred form for carrying out the present invention will be described.

Figure 1:
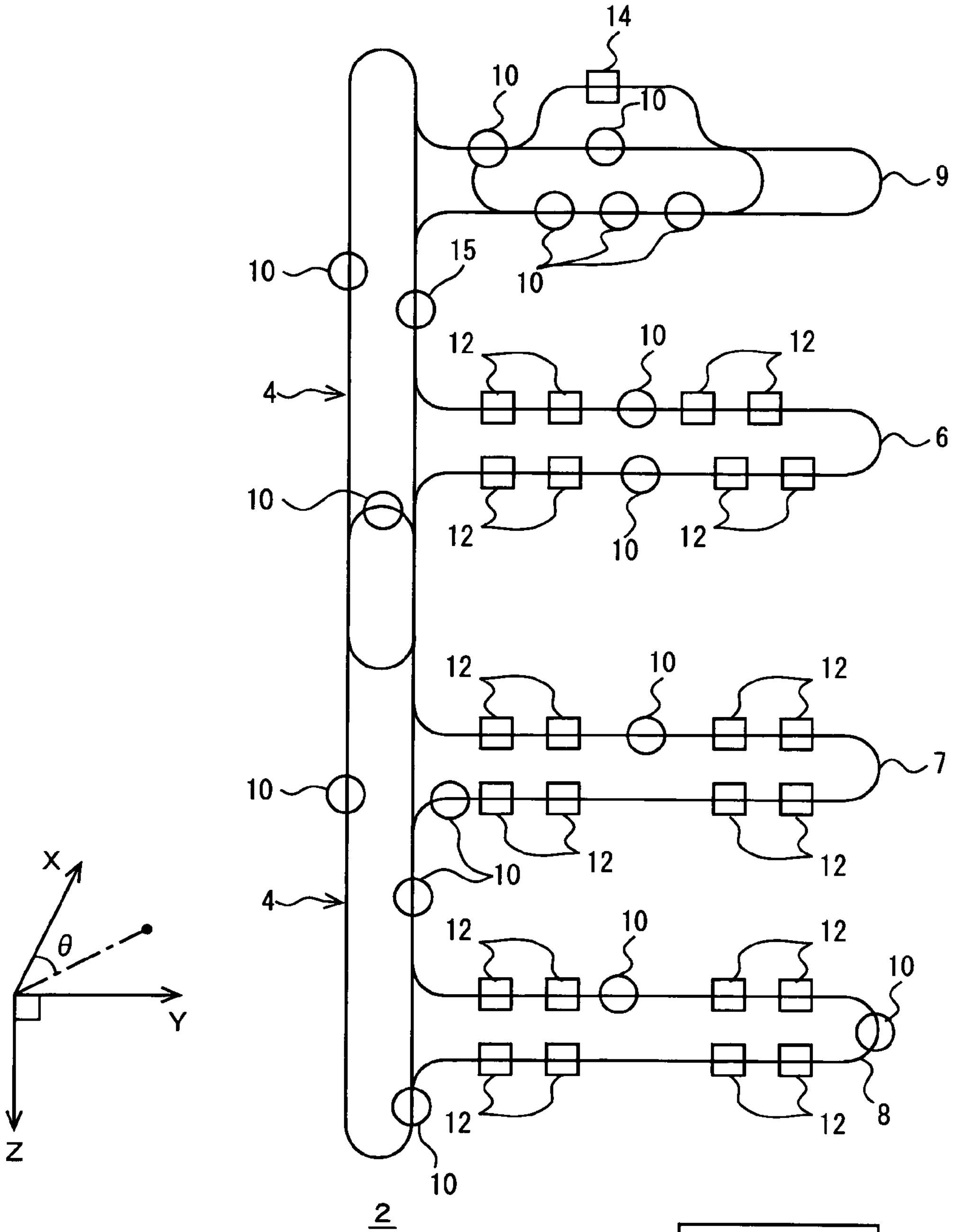
FIG. 1 is a plan view showing the layout of a guided vehicle system according to an embodiment.
Figure 1:
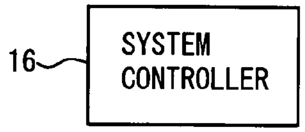

FIGS. 1 to 4 show a guided vehicle system 2 according to the embodiment. In FIG. 1, a reference numeral 4 denotes an inter-bay route as a main route and reference numerals 6 to 8 denote intra-bay routes 6 to 8 provided for respective bays. A reference numeral 9 denotes a maintenance bay route for maintenance of guided vehicles 10. Reference numerals 12 denote positions for transferring an article. For example, the transfer position 12 is a load port of a semiconductor processing apparatus, a station such as a stocker, or a buffer for temporarily storing an article. In the specification, the guided vehicles 10 are overhead traveling vehicles. The overhead traveling vehicles travel along a travel rail provided near a ceiling, and the number of the overhead traveling vehicles is, e.g., more than one hundred. The routes 4 to 9 are provided in an overhead space in a clean room. For example, more than 1000 transfer positions 12 are provided. At the transfer position 12, a side buffer is provided on a side of a travel rail at a load port near the ground or in the overhead space. The guided vehicle includes a travel unit which travels along the travel rail. The travel unit is controlled by a travel control unit. Further, a lateral drive supported by the travel unit is controlled by a lateral control unit, and a θ drive supported by the lateral drive is controlled by a θ control unit. An elevation drive unit supported by the θ drive elevates/lowers an elevation frame under the control of an elevation control unit. The lateral drive moves the elevation drive unit or the like toward the side of the travel rail, the θ drive rotates the elevation drive unit in a horizontal plane, and the elevation drive unit elevates/lowers the elevation frame where the article is chucked and released freely. The lateral drive and the θ drive may not be provided.

A master station 14 is provided in the maintenance bay route 9. Transfer data at the master station 14 (data required for transfer of an article to/from the master station 14) is obtained for every guided vehicle 10. A reference numeral 15 denotes a master vehicle. Machine difference data for each guided vehicle 10 is a difference between transfer data of the guided vehicle 10 and transfer data of the master vehicle 15, at the master station 14. The master vehicle 15 obtains the article transfer data at every transfer position 12. The guided vehicle 10 referred in the following description is intended to include the master vehicle as well as normal guided vehicles 10, unless it is clear from the context that the guided vehicle 10 is a guided vehicle other than the master vehicle 15. Further, preferably, in addition to the master station 14, an inspection station for the guided vehicle 10, a loop-like route for test traveling, and standby positions for standby guided vehicles are provided in the maintenance bay route 9.

The transfer data includes four coordinates, i.e., a stop position along the travel direction of the routes 4 to 9 (X coordinate), a position in a lateral direction of the travel route in the horizontal plane (Y coordinate), a downward position from the guided vehicle 10 (Z coordinate), and a rotational coordinate in the XY plane (θ coordinate). Further, the transfer data may includes type of the transfer position 12, and the order of transfer procedures. Assuming that the article transfer data of the four coordinates for the i-th guided vehicle 10 (the number assigned to the master vehicle 15 is 0) at the j-th transfer position 12 (the number assigned to the master station 14 is 0) is Cij, the following equation (1) is obtained. In the equation, (Ci0−C00) is referred to as the "machine difference data".

$$Cij=C0j+(Ci0-C00) \quad (1)$$

For the master vehicle 15, transfer data C0*j* at every transfer position 12 (suffix j) is obtained. For the normal guided vehicle 10 (suffix i), only transfer data Ci0 at the master station 14 is obtained, and only the machine difference data (Ci0−C00) is stored. The transfer data Cij at positions other than the master station 14 is calculated from the equation (1).

Figure 2:
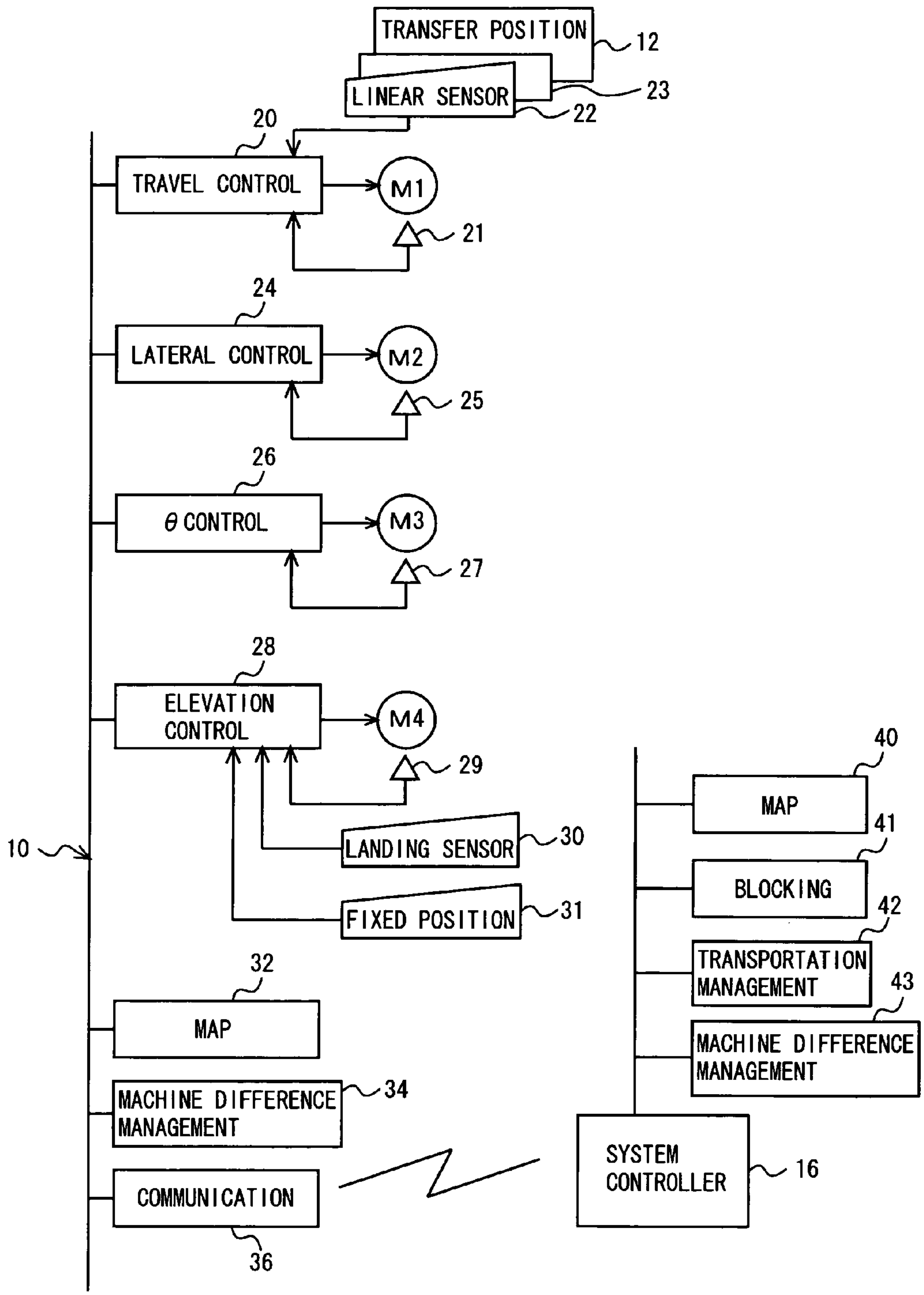
FIG. 2 is a block diagram showing a guided vehicle and a system controller used in the embodiment.

FIG. 2 shows a control system of the guided vehicle 10 and structure of a system controller 16. A travel control unit 20 controls a motor M1 for allowing the guided vehicle 10 to stop at the transfer position 12 with a predetermined accuracy of, e.g., ±1 mm or less. An encoder 21 counts the revolution number of the motor M1 or the revolution number of wheels. A reference numeral 22 denotes a linear sensor for confirming the stop position with an accuracy of, e.g., ±10 μm using a linear scale 23 provided at the transfer position 12 (only at the station and the load port). In the stop control, the remaining travel distance to the transfer position is determined using the linear sensor 22 to generate a speed pattern. The speed of the guided vehicle 10 is monitored by the encoder 21 such that the speed of the guided vehicle 10 is reduced in accordance with the speed pattern. After the guided vehicle 10 stops, the error at the stop position is detected using the linear sensor 22.

A lateral control unit 24 laterally feeds the elevation control unit and the elevation frame (not shown) of the guided vehicle 10 relative to the travel route, and monitors operation of a motor M2 by an encoder 25. A θ control unit 26 rotates the elevation control unit and the elevation frame in the horizontal plane by a motor M3, and monitors operation of the motor M3 by an encoder 27. An elevation control unit 28 elevates/lowers the elevation frame by a motor M4 and a suspension member (not shown), monitors operation of the motor M4 by an encoder 29, detects whether the transferred article has landed on the ground at the transfer position by a landing sensor 30, and detects whether winding of the suspension member has been completed by a fixed position sensor 31.

A map 32 stores a travel route. In particular, the map 32 stores data measured by the master vehicle using the transfer data at each transfer position. A machine difference management unit 34 stores the machine difference data (Ci0−C00). The actual transfer data is obtained by adding the machine difference data to the transfer data of the map 32. Alternatively, the machine difference may be added to the transfer data beforehand, and the map 32 may store the transfer data with the machine difference. Further, the machine difference management unit 34 stores data about the operating condition of the guided vehicle 10, and determines whether the machine difference needs to be measured again based on the stored data about the operating condition. A communication unit 36 communicates with the system controller 16 or like.

The system controller 16 has a map 40 same as the map 32. A blocking processing unit 41 prevents interference between the guided vehicles 10 on the travel route by blocking the travel route. A transportation management unit 42 assigns transportation commands to the guided vehicles 10, and manages the condition of executing the commands. A machine difference management unit 43 stores machine difference data for each guided vehicle 10, and stores data which can be determined from the transportation commands in the operating condition of each guided vehicle 10. For example, the travel distance, the travel time, the number of travels, the number of article transfers can be determined roughly based on the transportation commands and the map 40. However, the error at the stop position is stored only in the machine difference management unit 34 of the guided vehicle 10. The machine difference control unit 43 of the system controller 16 may not be provided.

Figures 3, 4:
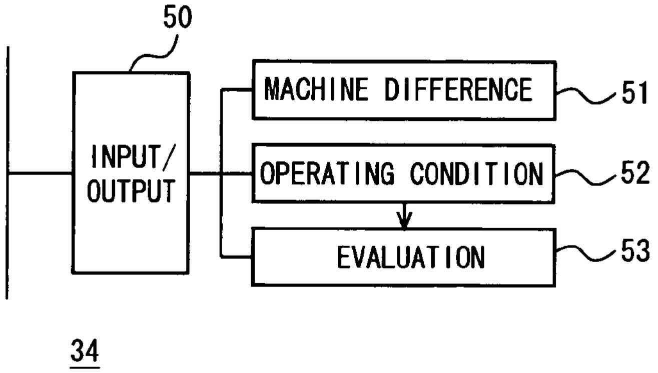
FIG. 3 is a block diagram showing a machine difference management unit of the guided vehicle used in the embodiment.
FIG. 4 is a diagram schematically showing an operating condition memory unit of the machine difference management unit.

FIGS. 3 and 4 show structure of the machine difference management unit 34 of the guided vehicle 10. A reference numeral 50 denotes an input/output used for communication with other control units. The input/output 50 may not be provided. A reference numeral 51 is a machine difference memory unit for storing machine difference data. An operating condition memory unit 52 stores data about the operating condition. For example, as shown in FIG. 4, the data about the travel control includes the total travel distance, the travel time, the number of travels, and the number of errors that are not within an allowable range (e.g., ±1 mm or more) in the case where the guided vehicle 10 stops at the transfer position with the linear scale, and the time when the error occurred. Instead of storing data about whether the error is within the allowable range or not, data about the moving average of errors at the stop position may be stored.

As for the lateral control, θ control, and elevation control, since it is difficult to detect the accuracy of operation, for example, the number of operations in each of the lateral control, θ control, and elevation control is stored. Further, as the additional data, the number of errors that occurred at the time of transferring an article due to the cause other than the stop position (X coordinate) is stored, and the number of errors due to the cause related to any of the lateral control, θ control, and elevation control is counted. Errors that occurred due to cause other than the stop position is detected by sensors such as the landing sensor 30. Further, the date on which the guided vehicle was introduced into the guided vehicle system for the first time (operation start date), and the number of times the machine difference data is updated, and the last update date are stored.

An evaluation unit 53 determines whether the machine difference data needs to be measured again based on the data stored in the memory unit 52. For example, in the case where a predetermined period of time has passed after the last update of the machine difference data, the number of errors in the travel control reaches a predetermined value, the number of any other error reaches a predetermined value, or the errors occur repeatedly at high frequency, the machine difference data needs to be measured again. If the machine difference data needs to be measured again, the guided vehicle 10 waits until other jobs are finished. Thereafter, the guided vehicle 10 travels to the master station of the maintenance bay route and measures the machine difference data again, and then, the guided vehicle 10 updates the value in the memory unit 52. At this time, the memory unit 52 resets the data about the travel control, lateral control, θ control, and elevation control, and resets the number of errors in the other item. Then, the memory unit 52 changes the number of updates, and the last update date. Further, the memory unit 52 transmits the updated machined difference data to the machine difference management unit of the system controller to update the data.

The embodiment has been described in connection with the case of a system of overhead traveling vehicles. Alternatively, the present invention is also applicable to a system of rail guided vehicles or non-rail guided vehicles that travel on the ground. Preferably, the data about the operating condition includes data reflecting errors in the transfer, e.g., the number of errors at the stop position in the embodiment. Alternatively, the data about the operation condition may only include the number of times components of the guided vehicle are used such as the number of travels and the number of transfers or data indicating how much the guided vehicle has been used. Further, the data about the operating condition may be only the time data that does not include data of any actual operating condition, such as the lapsed days after the last measurement of the machine difference. In this case, the necessity of updating the machine difference data can be managed easily by the system controller, rather than the management is carried out in each of the guided vehicles.

Figure 5:
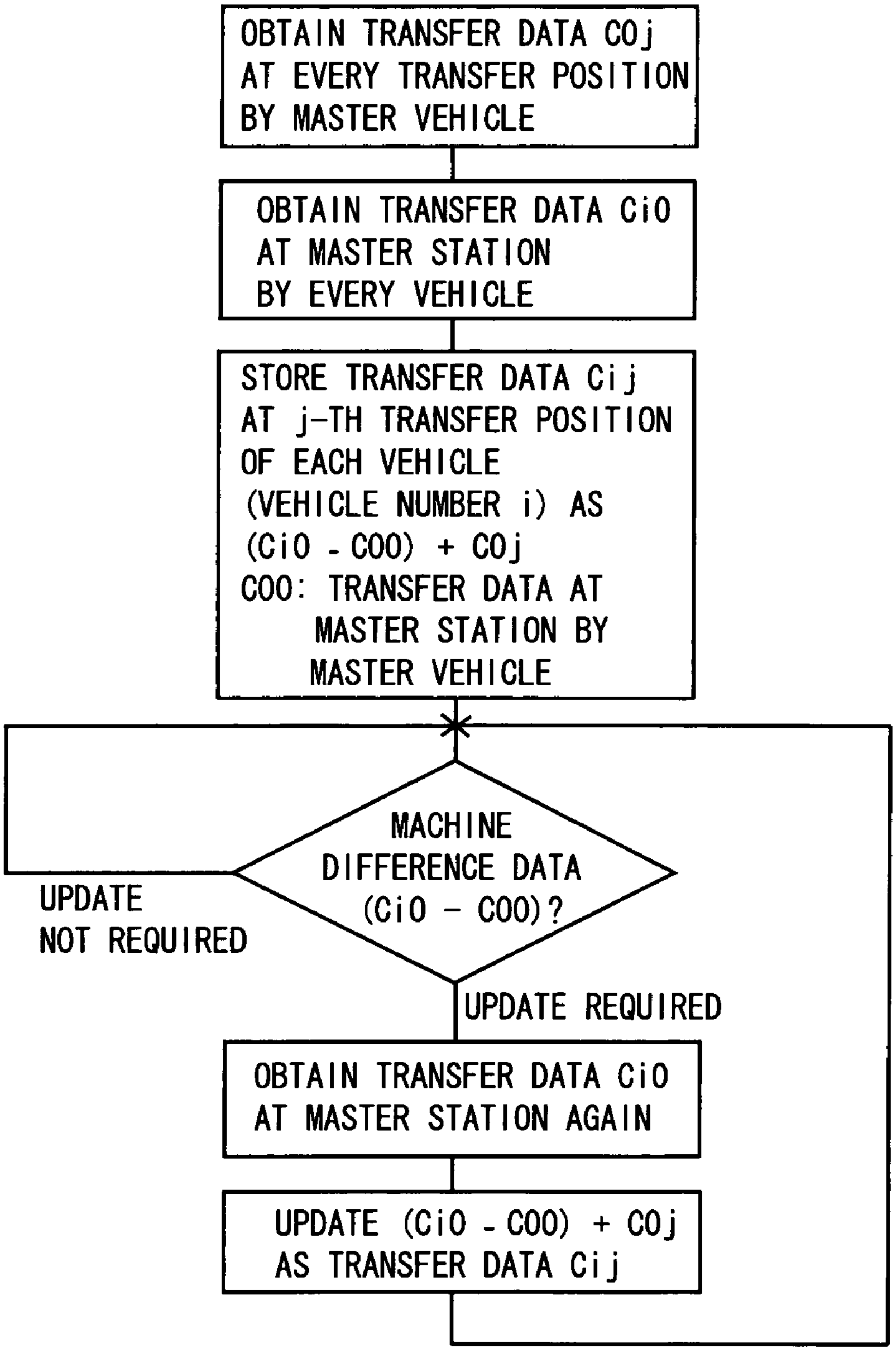
FIG. 5 is a flowchart showing an algorithm for updating machine difference data and transfer data of the guided vehicle according to the embodiment.

FIG. 5 shows a teaching method according to the embodiment. The details of steps in FIG. 5 have been described with reference to FIGS. 1 to 4. The master vehicle (vehicle number 0) obtains the transfer data C0*j* at every transfer position. Next, every vehicle (vehicle number i) obtains the transfer data Ci0 at the master station (transfer position number 0). Ci0−C00 is regarded as the machine difference data. The transfer data Cij for the guided vehicle corresponding to the vehicle number i at the j-th transfer position is stored as (Ci0−C00)+C0j. Based on the data of FIG. 4, it is determined whether the machine difference data needs to be measured again. If the machine difference data needs to be updated, the transfer data Ci0 of the master station at the transfer position number 0 is obtained again, and Ci0−C00 is regarded as the new machine difference data. Thus, the new transfer data (Ci0−C00)+C0*j* at each transfer position is stored.

As a result, in the embodiment, the following advantages can be obtained.

1) After measurement of the machine difference data, if the condition of the guided vehicle changes, e.g., due to abrasion of the travel wheels or the other mechanical components, the machine difference data is measured again. Therefore, before the difference between the memorized value and the actual value of the machine difference data becomes significant, and transfer of the article becomes difficult, it is possible to correct the machine difference data.

2) Management for determination of whether the machine difference data needs to be measured again can be made autonomously. Therefore, it is not necessary to transmit data such as the error at the stop position to the system controller.

3) The most important data in the machine difference data is the difference of the stop position, e.g., due to the difference in the diameter of the travel wheels. Therefore, the error at the stop position corresponding to the transfer position is considered in determining whether the machine difference data needs to be updated. Thus, the influence of, e.g., abrasion of the travel wheels is reduced advantageously.

The invention claimed is:

1. A guided vehicle system, comprising:

a master guided vehicle which obtains transfer data for transferring an article at a master transfer position and one or more non-master transfer positions, one or more non-master guided vehicles, each of which obtain transfer data for transferring said article at said master transfer position, each of said non-master guided vehicles determining a difference between said transfer data for transferring said article at said master transfer position obtained by said master guided vehicle and said transfer data for transferring said article at said master transfer position obtained by each said non-master guided vehicle as machine difference data, and a determination means for determining whether said machine difference data needs to be measured again based on conditions of each of said master guided vehicle and said non-master guided vehicles, wherein data obtained by adding said machine difference data to said transfer data obtained by said master guided vehicle is stored as transfer data at each of said plurality of transfer positions, wherein said determination means is provided in each of said non-master guided vehicles for storing the vehicle's operating condition and determining whether said machine difference data needs to be measured again, wherein if said determination means determines that said machine difference data needs to be measured again, said non-master guided vehicle travels to said master transfer position to obtain the machine difference data again, wherein each of said master guided vehicle and non-master guided vehicles has a travel unit supported by a travel rail in an overhead space for traveling along the travel rail, and an elevation unit supported by said travel unit for elevating/lowering said article;

wherein a mark indicating a stop position for stopping each of said master guided vehicle and non-master guided vehicles at said transfer position is provided along said travel rail, and said travel unit has a sensor for detecting said mark to determine an error at said stop position;

wherein said elevation unit has means for detecting a failure in transferring said article at said transfer position; and wherein said determination means determines a value indicating the degree of the error at said stop position, and a value indicating the degree of the transfer failure.

2. The guided vehicle system of claim 1, wherein said determination means counts a number of errors with a value not less than a predetermined value at said stop position as a value indicating a degree of the error at said stop position, and counts a number of transfer failures as a value indicating a degree of the transfer failure.

3. The guided vehicle system of claim 2, wherein said determination means stores a time when said machine difference data was updated, wherein said determination means determines whether said machine difference data needs to be obtained again at least based on: a lapsed period of time from the update time; the number of the errors with the value not less than the predetermined value at said stop position; and the number of the transfer failures, and wherein said determination means resets the number of the errors with the value not less than the predetermined value at said stop position and the number of the transfer failures when said machine difference data is obtained again.

4. A teaching method in guided vehicle system having a master guided vehicle, one or more non-master guided vehicles, a master transfer position and one or more non-master transfer positions, the method comprising the steps of:

obtaining, by said master guided vehicle, transfer data for transferring an article at said master transfer position and each of said non-master transfer positions, obtaining, by each of said non-master guided vehicles, transfer data for transferring said article at said master transfer position, determining, by each of said non-master guided vehicles, machine difference data based on a difference between said transfer data obtained by said master guided vehicle at said master transfer position and said transfer data obtained by each of said non-master guided vehicles at said master transfer position, adding said machine difference data to said transfer data obtained by said master guided vehicle to obtain transfer data at each of said master and non-master transfer positions, determining whether said machine difference data needs to be measured again based on conditions of each of said master and non-master guided vehicles; and measuring said transfer data at said master transfer position again, for one of said non-master guided vehicles which needs measurement of said machine difference data again, to newly determine machine difference data to update said transfer data at each of said master and non-master transfer positions, wherein each of said master guided vehicle and non-master guided vehicles has a travel unit supported by a travel rail in an overhead space for traveling along the travel rail, and an elevation unit supported by the travel unit for elevating/lowering the article;

wherein a mark indicating a stop position for stopping each of said master and non-master guided vehicles at said master and non-master transfer positions is provided along said travel rail, and said travel unit has a sensor for detecting said mark to determine an error at said stop position;

wherein said elevation unit has means for detecting a failure in transferring said article at said transfer position; and wherein the determination means determines a value indicating the degree of the error at said stop position, and a value indicating the degree of the transfer failure.

* * * * *